United States Patent [19]

Kalina

[11] 4,205,365

[45] May 27, 1980

[54] BOXED CAPACITOR WITH BIMETALLIC TERMINALS AND METHOD OF MAKING

[75] Inventor: Robert F. Kalina, Lombard, Ill.

[73] Assignee: Western Electric Company, Incorporated, New York, N.Y.

[21] Appl. No.: 974,196

[22] Filed: Dec. 28, 1978

[51] Int. Cl.² .............................................. H01G 1/14
[52] U.S. Cl. .................................. 361/308; 29/25.42; 29/855; 174/52 PE; 338/322; 361/306; 361/404
[58] Field of Search ............... 361/308, 309, 306, 404; 29/25.42, 628, 621; 338/322; 174/52 PE

[56] References Cited

U.S. PATENT DOCUMENTS

| | | |
|---|---|---|
| 2,531,185 | 11/1950 | Wurster . |
| 3,248,681 | 4/1966 | Reintgen ................... 174/52 PE |
| 3,439,395 | 4/1969 | Claypoole et al. ............... 29/628 X |
| 3,588,618 | 6/1971 | Otte ............................. 361/404 X |
| 3,906,297 | 9/1975 | Hunt . |
| 3,939,440 | 2/1976 | Berg et al. . |

OTHER PUBLICATIONS

"2-Lead Dip Ceramic Caps by Aux", in Electronic News, 10/76, p. 48.

*Primary Examiner*—E. A. Goldberg
*Attorney, Agent, or Firm*—R. P. Miller

[57] ABSTRACT

A rolled metallized film capacitor is terminated with bimetallic terminals. A method of manufacture of this terminated capacitor contemplates inserting a capacitor blank with heat fusible end electrodes in a plastic box to position the electrodes between a pair of "L" shaped bimetallic terminals constructed of laminations of materials having different coefficients of expansion. The terminals extend through opposed walls of the box and are heated to flex feet of the terminals into firm engagements with the end electrodes whereupon the heat is effective to bond the terminals to the capacitor blank. Encapsulant is deposited in the box to provide a moisture seal while also assisting to hold the terminals in the bonded positions.

9 Claims, 3 Drawing Figures

BOXED CAPACITOR WITH BIMETALLIC TERMINALS AND METHOD OF MAKING

TECHNICAL FIELD OF THE INVENTION

This invention relates to rolled metallized film capacitors having bimetallic terminals and methods of manufacture thereof, and more particularly to a rolled film capacitor that is terminated by heat flexing bimetallic terminals into bonding engagement with heat fusible electrodes on opposed ends of a rolled film capacitor blank.

BACKGROUND OF THE INVENTION

The bonding or securing of terminals is a problem that exists in the manufacture of machine insertable circuit modules known as DIP's (Dual In-Line Packages). In these packaged devices the circuit components are included in a small plastic box, and it is necessary to provide external leads that are bonded to the internal boxed circuits. Further, in the design of modern day circuitry there are needs for small box packed, passive components such as capacitors and resistors which are machine insertable and bondable to printed circuit boards. Again in the manufacture of these boxed discrete components, there is a problem of bonding externally extending leads to internally boxed components. In particular, the present invention contemplates providing a terminal bonding and packaging method for small rolled film capacitors or other discrete electrical devices in such a manner as to provide packaged devices which are readily machine insertable in printed circuit boards.

In the assembly of these types of electrical components or modules, it is necessary to attach lead wires or terminals to what may be termed a component blank so that the attachment is made with a minimum amount of series resistance being introduced at the attachment sites. If a significant series resistance is introduced at the bonding site, then a terminated component may be unsuitable for use in utilization circuits having critical electrical requirements. One of the causes of introduction of excessive series resistance resides in not providing sufficient force to terminal leads during the bonding of the leads to the component which results in the formation of defective bonds. Further, if insufficient force is applied to the terminal leads during bonding, a defective bond may not be easily detected following manufacture but may result in terminal lead separation or the introduction of added resistance due to degradation of the bonded interface during subsequent use of the terminated component in a utilization circuit. The problem is further complicated when the lead attachment must be effected within a very small box containing the component to be terminated.

Lead terminal bonding is recognized as a continuing problem and many different methods have been devised in attempts to secure good bonds of terminals to components such as rolled metallized film capacitors. In particular, many diverse types of termination methods and terminal structural arrangements have been developed to terminate rolled metallized film capacitors. As an example, U.S. Pat. No. 2,531,185 to J. H. Wurster discloses the use of conductive strips as terminations of rolled film type capacitors wherein the conductive strips are laid to engage exposed portions of the metallized capacitor plates, and then are held in place by a strap of insulating material wrapped around the capacitor. In U.S. Pat. No. 3,906,297 to D. E. Hunt there is illustrated a terminal construction for rolled film capacitors wherein feet sections of "L" shaped lead wires are bonded to metal or solder end electrodes formed on the ends of the rolled film capacitor blanks. Moreover, during termination of rolled film capacitors of this general type, such as disclosed in U.S. Pat. No. 3,939,440 to Berg et al., it is the common practice to grip a pair of terminals, and advance the gripped terminals into forcible engagement with heat fusible metallic electrodes formed on opposite ends of a capacitor blank while applying heat to bond the terminals to the capacitor blank.

SUMMARY OF THE INVENTION

The invention contemplates, among other things, a method of fixing a pair of bimetallic leads into engagement with solder electrodes formed at spaced locations on an electrical component blank while heat is applied through the leads to melt portions of the solder electrodes, and thus provide bonded connections between the leads and the component blank.

More particularly, considering one embodiment of the invention, the method contemplates molding an open-ended plastic box, with a pair of bimetallic terminals extending through opposed walls of the box. The terminals are shaped and positioned so that the metals having the lower coefficients of expansion are facing each other. A rolled film capacitor blank with heat fusible and electrodes is inserted in the box so that the end electrodes are positioned between the bimetallic terminals. Upon application of heat to the bimetallic terminals, the terminals will flex toward each other and into engagement with the end electrodes. The heat applied to the terminals is also effective to partially melt or soften the engaged heat fusible end electrodes, whereupon the terminals are bonded to the end electrodes. The box is filled with an encapsulant to moisture seal the capacitor and, at the same time, provide additional support for holding the terminals in the bonded positions.

BRIEF DESCRIPTION OF THE DRAWING

Other features and advantages of the present invention will be apparent upon consideration of the following detailed description and the drawing, wherein.

DETAILED DESCRIPTION

Figure 3:
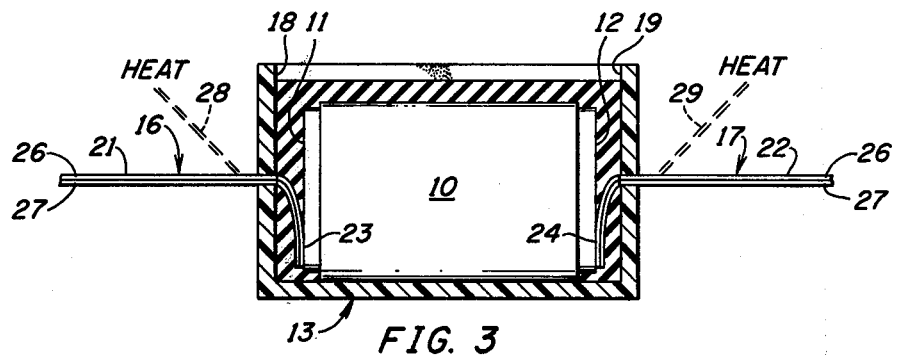
FIG. 3 is a side elevational view, partially in section, of the box with a capacitor blank positioned therein to be engaged and bonded to a pair of flexed, bimetallic terminals.

Referring first to FIG. 3 there is shown a conventional rolled film capacitor blank 10 having opposed heat fusible end electrodes 11 and 12 which are to be terminated by the present invention. The body of the capacitor is formed by simultaneously winding two metallized films in such a fashion that the metallized surface on each film engages a non-metallized surface on the other film. The initial metallization of the films is accomplished by masking one edge margin of each film so that an opposed margin on each rolled film is free of metal. During the winding, the films are slightly offset with respect to each other to facilitate the subsequent attachment of the end electrodes 11 and 12 to individual metallized surfaces on the respective films. The end electrodes 11 and 12 are composed of heat fusible or heat activated material and are usually formed by spraying zinc or solder against the ends of the wound films. Inasmuch as the metallized surface on each film only extends to one edge, each end electrode will only contact one metallized surface on one film.

An example of a small rolled metallized film capacitor blank which may be boxed and terminated in accordance with the present invention is shown in an application filed on even date herewith in the names of W. J. Fanning and O. T. Masopust, Jr. and entitled METALLIZED FILM CAPACITOR AND METHOD OF MANUFACTURE, assigned to the Western Electric Company, Incorporated.

Figure 1:
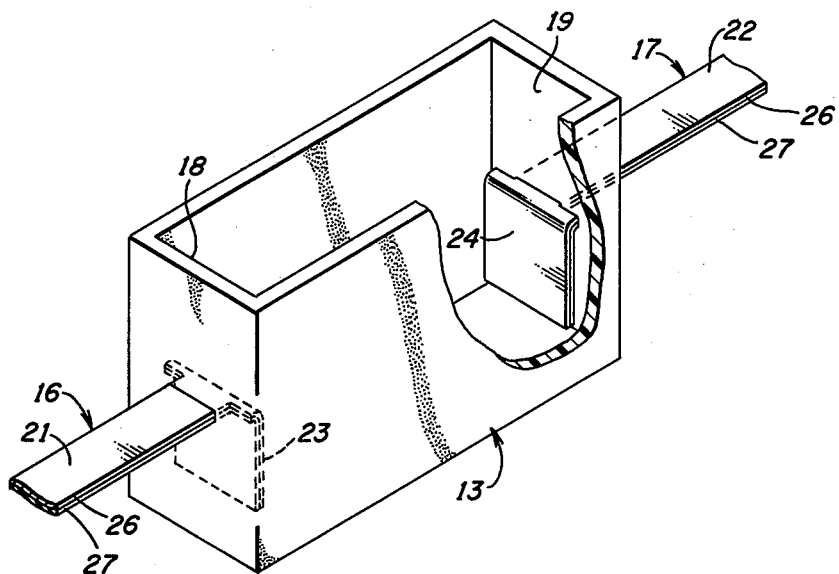
FIG. 1 is a perspective view of a molded plastic box having bimetallic terminals extending through opposed walls, constructed in accordance with the principles of the present invention.

Attention is directed to FIG. 1 which shows a small plastic box 13. The box is molded from a thermosetting plastic having good insulation properties such as a glass filled alkyd compound "GLASKYD 1910" sold by the Glaskyd Company. When the box is molded, terminals 16 and 17 are positioned within the mold so as to extend through opposed sidewalls 18 and 19. The terminals are in an "L" shaped configuration with elongated lead or shank sections 21 and 22 extending through the box and laterally extending foot sections 23 and 24 positioned adjacent to the sidewalls 18 and 19. The foot sections 23 and 24 may be bent into a downward position subsequent to the molding operation. As illustrated, these foot sections 23 and 24 are considerably larger than the lead sections 21 and 22. In the alternative, the box may be provided with slots in the opposed walls and the terminals inserted as a separate assembly operation.

Figure 2:
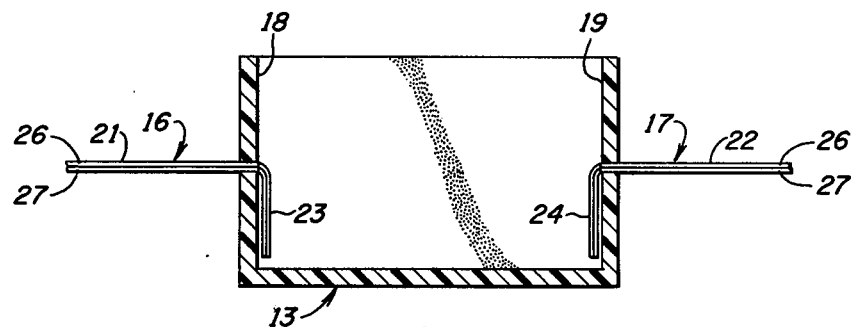
FIG. 2 is a side sectional view of the box shown in FIG. 1 particularly illustrating an "L" shaped configuration for the terminals.

Each terminal 16 or 17 is constructed of two bonded laminations of metals having different coefficient expansion. The upper lamination designated by the reference numeral 26 (see FIG. 2) may be constructed of steel while the lower lamination designated by the reference number 27 may be constructed by brass. The metals selected should have good heat and electrical conductivity properties, as well as the ability to be solder bonded. The upper lamination 26 may be tinned with tin or a tin alloy to enhance the bonding of the end electrodes to the terminals. It may be thus appreciated that the application of heat to the terminals 16 and 17 will result in a bending or flexing of these terminals toward the metal laminations having the lower coefficient of expansion which in this instance are the laminations 26.

The next step of the method, as illustrated in FIG. 3, contemplates inserting a capacitor blank 10 into the box 13 so that the heat fusible end electrodes 11 and 12 are positioned between and aligned with the foot sections 23 and 24 of the terminals 16 and 17. The foot sections 23 and 24 may be inclined inwardly toward each other, so that the insertion of the capacitor blank causes the end electrodes to engage, wipe against and deflect the foot sections to insure a good clean mechanical contact prior to bonding.

Heat from a suitable source is applied, as illustrated by the dashed lines 28 and 29, to the terminals 16 and 17 in the vicinity of their entry into the box. The heat is effective to flex or flex stress the terminal foot sections 23 and 24 toward each other and into forced engagement with the heat fusible end electrodes 11 and 12. The inward flexing of the terminals and forceful engagement with the end electrodes is assured because the terminals are seated and restrained in the opposite walls of the box.

The heat is readily conducted through the foot sections to the end electrodes and causes portions of the heat fusible material to melt. Subsequent removal of the heat effectuates the solidification of the metal electrodes and the bonding of the foot sections 23 and 24 to the end electrodes 11 and 12. The lead sections 21 and 22 of terminals 16 and 17 are bent upwardly into substantially parallel positions to permit the subsequent insertion of the terminals in holes formed in a printed circuit board. The box 13 is filled with an encapsulant such as an epoxy resin to provide a moisture seal for the capacitor 10. When the encapsulant is solidified, mechanical support is provided to hold the feet 23 and 24 in the bonded positions.

The described embodiment of the invention sets forth a method of manufacturing a boxed rolled film capacitor, but it is believed readily apparent that the method can be used to terminate many diverse types of devices other than capacitors. Resistors, inductors or circuit modules may be readily substituted for the capacitors 10. Other types of capacitors, such as ceramic capacitors, can also be terminated by the practice of the described methods. The small boxed and terminated electrical devices produced by the described method may be easily machine inserted in or bonded to a printed circuit board or other electrical support structure.

What is claimed is:

1. A method of terminating an electrical component with a pair of terminals, which comprises:
    positioning a pair of bimetallic terminals adjacent said component, with heat activated bonding material interposed between the terminals and the component, said bimetallic terminals being constructed of two laminations of metal having different coefficients of expansion, the laminations of the respective terminals having the lower coefficient of expansion facing said component; and
    applying sufficient heat to said terminals to flex them against said component while said interposed heat activated bonding material is activated to bond the terminals to the component.

2. A method of bonding terminals to opposed sides of an electrical component, which comprises:
    forming a pair of terminals from a laminated strip of two materials having different coefficients of expansion;
    positioning the pair of terminals on opposite sides of the electrical component with heat activated bonding material interposed between the terminals and the component, the positioning being such that the laminations of material having the lower coefficient of expansion are facing the interposed component; and
    applying heat to the terminals while restraining a section of each terminal to flex the free ends of the terminals into engagement with the component, said applied heat being of sufficient magnitude to activate the heat activated bonding material to bond the component to the flexed terminal.

3. A method of manufacturing a boxed rolled film capacitor, which comprises:
    fabricating an open-ended box constructed of dielectric material with a pair of bimetallic terminals extending through a pair of opposed walls of the box and having sections facing each other, said bimetallic terminals being constructed of strips of metals having different coefficients of expansion with strips having the lower coefficient of expansion facing each other;

inserting a rolled film capacitor blank with end electrodes of heat bondable materials into the box to position the end electrodes in alignment with the facing sections of the terminals; and applying heat to said terminals to impart flexing forces to urge the terminals into firm engagement with the end electrodes while said heat acts to bond the electrodes to the terminals.

4. A method of manufacturing a boxed rolled film capacitor as defined in claim 3, which further comprises:

filling the box with a settable encapsulating material to hold the terminals against the end electrodes upon removal of the heat to the terminals.

5. A method of manufacturing a boxed rolled film capacitor, as set forth in claim 3 in which, the bimetallic terminals are L-shaped to provide elongated sections extending through the opposed box walls and laterally extending foot sections which are heat flexed into engagement with the end electrodes.

6. A method of fabricating a boxed rolled film capacitor, as defined in claim 3, wherein the box fabricating step comprises:

molding the box with the bimetallic terminals extending through and molded in the opposed walls of the box.

7. A method of bonding terminals to heat activated terminal pads secured to opposite ends of a rolled film type capacitor, which comprises:

forming a pair of L-shaped terminals from a laminated strip of two metals having different coefficients of expansion;

forming a box of insulating material with the L-shaped terminals extending through opposed walls of the box with first legs of the terminals positioned adjacent opposed walls of the box so that the metal laminations having the lower coefficient of expansion face each other;

placing a capacitor in the box with the terminal pads interposed between said first legs; and applying heat to the other legs of said terminals to flex the terminals into engagement with the terminal pads whereafter the heat is effective to activate and bond the terminal pads to the flexed terminals.

8. A boxed capacitor, comprising:

a box of insulating material, said box having an open end and a pair of opposed sidewalls;

a pair of terminals extending through said sidewalls of said box, each terminal constructed of laminations of metals having different coefficients of expansion, sections of laminations of the respective terminals having the lower coefficient of expansion facing and inclined toward each other; and a capacitor having heat fusible end electrodes positioned in said box with the end electrodes bonded to the facing laminations of said terminals.

9. A capacitor assembly, which comprises:

a rolled film capacitor having end electrodes of heat activated bonding material;

a box constructed of insulating material for receiving said capacitor;

a pair of L-shaped terminals having elongated sections extending through opposed walls of said box and laterally extending foot sections bonded to said end electrodes, said terminal constructed of laminations of metals having different coefficients of expansions, said laminations having the lower coefficients facing said end electrodes, said laminations being under stress to flex said foot sections away from said end electrodes; and an encapsulant substantially filling said box to further hold said foot section from flexing away from said end electrodes.

* * * * *